Sept. 19, 1967  S. W. MARSH  3,342,447
RESILIENT BEARERS FOR STRUCTURES OR MACHINERY
Filed June 28, 1965  2 Sheets-Sheet 1
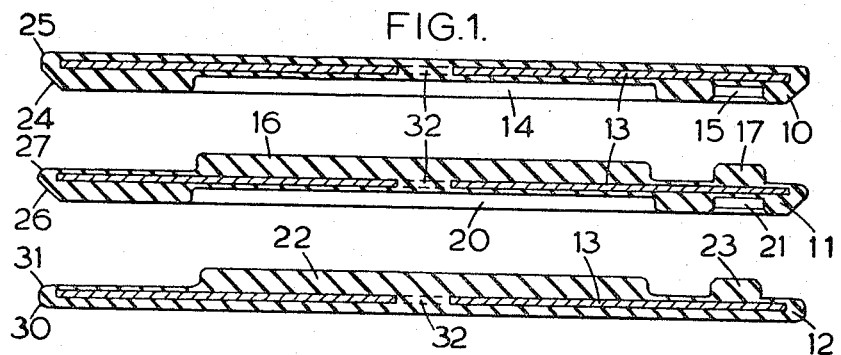
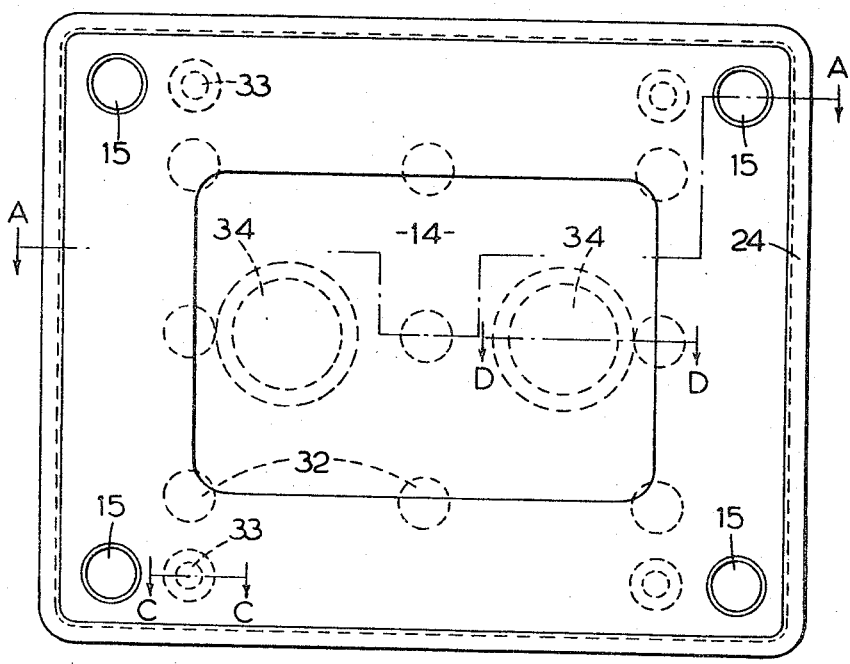
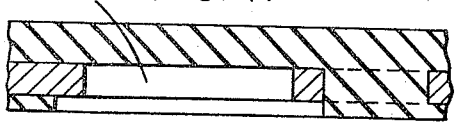
INVENTOR
SYDNEY WILLIAM MARSH
By Linton and Linton
ATTORNEYS Sept. 19, 1967  S. W. MARSH  3,342,447
RESILIENT BEARERS FOR STRUCTURES OR MACHINERY
Filed June 28, 1965  2 Sheets-Sheet 2
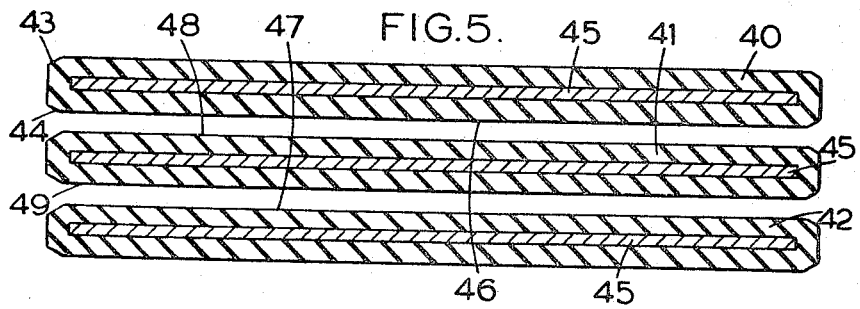
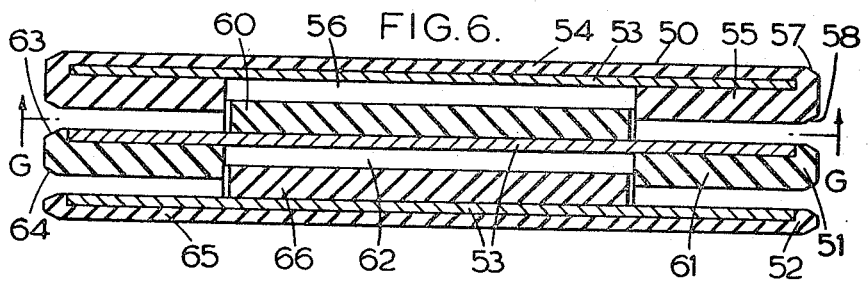
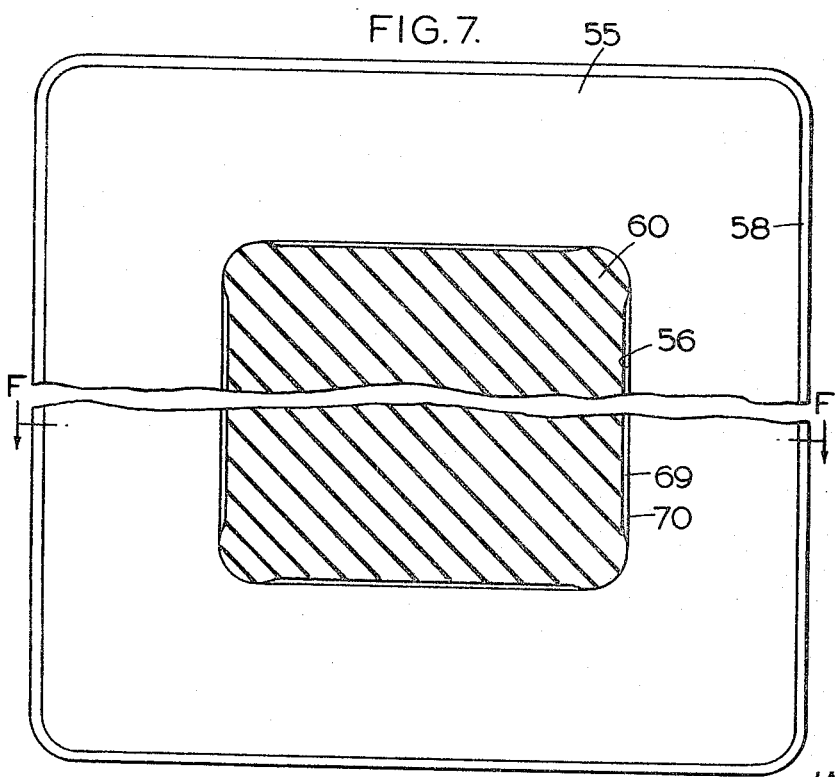
INVENTOR
SYDNEY WILLIAM MARSH United States Patent Office 3,342,447
Patented Sept. 19, 1967

3,342,447
RESILIENT BEARERS FOR STRUCTURES OR MACHINERY
Sydney W. Marsh, New Malden, Surrey, England, assignor to Andre Rubber Company Limited, Surbiton, Surrey, England
Filed June 28, 1965, Ser. No. 467,240
Claims priority, application Great Britain, June 30, 1964, 26,967/64; 26,968/64; July 17, 1964, 29,333/64
8 Claims. (Cl. 248—350)

ABSTRACT OF THE DISCLOSURE

The present invention is concerned with resilient load supporting bearings for structures and which bearings each consists of a stack of superimposed slabs of elastomeric material with each slab having a metal plate therein for reinforcing the same and the adjacent surfaces of each pair of slabs are shaped to provide keying means between the adjacent slabs.

---

The invention relates to resilient load-supporting bearings for civil engineering structures, such as viaducts, bridges, dams, buildings and for machinery, the bearings comprising a mass of elastomeric material having incorporated therein reinforcing material such as laminae in the form of metal plates. The reinforcing material extends generally parallel with the top and bottom surface bearings.

Generally, such bearings are loaded horizontally and vertically. The vertical load comprises the dead weight of the supported structure and any live load on the structure and this load acts perpendicularly to the top and bottom surfaces of the bearing and is carried by the elastomeric material which is thus subjected to compression. The horizontal load is due to movement of the supported structure caused by thermal expansion and contraction and this deflects the top surface of the bearing laterally with respect to the bottom surface so that the bearing is loaded in shear.

The size of the bearing will largely depend on the magnitude of the load to be carried. The horizontal cross-sectional area will be selected according to the maximum desired vertical load to be carried by the bearing. The actual shape of this area will depend on factors such as the tilt which the bearing is required to accommodate. The vertical height of the bearing will be selected so that the required horizontal deflection can be accommodated by the bearing without overstraining the bearing in shear.

Engineering specifications for the construction of various structures generally call for a bearing to withstand a given vertical load and to accommodate a given horizontal deflection. Consequently, in the case of the conventional unitary bearings, each comprising a single moulded block of elastomeric material having one or more reinforcing laminae embedded in it, it is necessary to produce a multiplicity of bearings not only of different horizontal cross-sectional areas to suit various different vertical loads but also of different heights to permit different horizontal deflections. This entails the provision of a very wide range of bearings to meet all likely requirements and also a multiplicity of different sized and differently shaped moulds.

The main object of the present invention is to provide an improved construction of bearing which will be suitable for different specifications, particularly different requirements as to the horizontal deflections, with a relatively small number of different moulded slabs which can be held in stock to meet a large range of different applications.

According to the present invention a bearing comprises a stack consisting of a plurality of superimposed separate slabs of elastomeric material, such as rubber or synthetic rubber, each slab having at least one reinforcing lamina associated therewith and, keying means provided between adjacent slabs across their contiguous surfaces and such as to prevent appreciable relative movement between the contiguous surfaces. Thus, for any given vertical load, only one set of slabs is needed, variations in the required horizontal deflection being accommodated by varying the number of slabs in the stack.

In one form of the invention each slab has embedded in it at least one reinforcing lamina and the keying means comprise one or more spigots projecting from one side of a slab and one or more complementary sockets or recesses in the proximate face of the adjacent slab. Usually it is required that the top and bottom surfaces of any particular horizontal cross-sectional area be of only three different kinds of slab, namely, a first terminal slab with one flat surface and with one or more recesses in the opposite surface; an intermediate slab with one or more complementary spigots protruding from one surface and with one or more complementary recesses in the opposite surface; and a second terminal slab having one or more complementary spigots protruding from one surface, the opposite surface being flat.

In another form of the invention particularly applicable to cases where the ratio of maximum horizontal deflection to vertical load on the bearing is not large, and is indeed less than the static friction between the adjacent surfaces of the stacked slabs, these may be merely stacked upon one another in the as-moulded condition, the mating surfaces of the slab being essentially flat. In this case the keying means is provided by the frictional resistance to slip between the mating surfaces of the slabs, and provision may be made for enhancing this frictional resistance.

In a further form of the invention one terminal slab comprises a surround of elastomeric material bonded to a reinforcing lamina so as to form a band adjacent the periphery of the lamina, this band embracing an area of substantially exposed lamina. The opposite side of the terminal lamina may have bonded to it a layer of elastomeric material extending over its entire surface and preferably extending around its edges so as to be integral with the surround.

The other terminal slab comprises a reinforcing lamina having bonded to one of its surfaces a spigot of elastomeric material in shape, size and position complementary to the substantially exposed area of the first terminal slab. The opposite face of this other terminal slab may have a layer of elastomeric material bonded to it and this layer may extend around the edges of the lamina.

Each of the intermediate slabs comprises a reinforcing lamina having bonded to one of its opposite sides a surround of elastomeric material of shape, size and location, corresponding with the surround of the first terminal slab and bonded to the other opposite side a spigot the geometry of which corresponds with that of the spigot on the other terminal slab and complementary to that of the surround on its first side. Thus the terminal slabs and intermediate slabs have complementary male and female elastomeric key means and any desired number of intermediate slabs may be stacked one upon another between two terminal slabs to produce bearings for a given vertical load and various horizontal deflections.

In alternative forms of the invention the spigots and complementary sockets of the slabs may be single or numerous and they may be of almost any shape, such as circular, polygonal, star-shaped or cruciform.

Constructional forms of the invention will now be described, by way of example only, with reference to the accompanying drawings, in which, FIG. 1 is an exploded section through the component slabs of one form of bearing along the line A—A of FIG. 2, FIGURE 2 is an underside view of the top slab of the bearing shown in FIGURE 1, FIGURE 3 is a part-section along the line C—C of FIGURE 2, FIGURE 4 is a part-section along the line D—D of FIGURE 2, FIGURE 5 is a section similar to FIGURE 1 of an alternative embodiment, FIGURE 6 is a section similar to FIGURE 1 and taken along line F—F of FIGURE 7, and FIGURE 7 is a section taken along the line G—G of FIGURE 6.

Referring now to FIGURES 1 and 2 the bearing comprises three slabs which are assembled in a stack for use but which are shown separated from each other for the purpose of illustration. Each slab has a cross-sectional area large enough to carry the vertical load to be placed on it in use and the slabs together are capable of deflecting in shear to accommodate the horizontal deflection of the particular application for which the stack of slabs is intended.

The three slabs comprise a top slab 10, an intermediate slab 11 and a bottom slab 12. The slabs all include a lamina 13 of reinforcing material extending in a direction substantially parallel to the top and bottom surfaces of the slab.

The slabs have keying means comprising one or more spigots projecting from one side of a slab and one or more complementary sockets or recesses in the proximate face of the adjacent slab. The top slab 10 has a large central recess 14, which is substantially rectangular in shape as best seen in FIGURE 2, and the top slab also has four circular recesses 15. The intermediate slab 11 has a central spigot 16 of a complementary shape and size to fit into the recess 14 and the intermediate slab also has four circular spigots 17 for locating in the circular recesses 15 of the top slab.

The lower face of the intermediate slab 11 is provided with a central rectangular recess 20 and four circular recesses 21 which are respectively identical with the recesses 14 and 15 on the lower side of the top slab 10. Similarly the top side of the lower slab 12 has a central rectangular spigot 22 and four circular spigots 23 arranged to locate in the respective recesses 20 and 21 of the lower side of the intermediate slab. It can be seen that the recesses on the lower sides of the top and intermediate slabs are identical and the spigots on the top sides of the bottom and intermediate slabs are also identical. Thus the slabs are provided with a series of interengaging spigots and recesses and any number of intermediate slabs can be positioned between a top slab and a bottom slab so as to provide the required vertical height for the bearing whereby to achieve the required horizontal deflection within the deflection limits of the elastomeric material from which the slabs are made.

For bearings of a particular horizontal cross-sectional area three, and only three different kinds of slabs are needed; namely, a first terminal slab, such as the top slab 10, with one flat surface and with one or more sockets in the opposite surface; one or more intermediate slabs such as the intermediate slab 11 with spigots on one surface complementary to the sockets on the first terminal slab and with sockets or recesses on the opposite surface; and second terminal slab such as the bottom slab 12 having spigots protruding from one surface which are complementary to the sockets in the intermediate slab, the opposite surface being flat.

The edges of the slabs are bevelled or rounded; the top slab is bevelled at 24 around one edge and has the other edge rounded at 25. The intermediate slab 11 has a bevelled edge at 26 and a rounded edge at 27 and the bottom slab 12 has two rounded edges at 30 and 31. The lamina are all provided with nine equalising holes 32 which enables the elastomeric material to flow through the lamina from one side to the other during the moulding operation before the elastomeric material is solidified so that the whole of the mould is properly filled with elastomeric material. In FIG. 2 it can be seen that the equalising holes are provided in a rectangular pattern but this is not necessary and such holes may be provided at irregular dispositions wherever it is found during the manufacturing process that equalisation is required between opposite sides of a lamina.

The lamina each also have four core holes 33 on which each lamina is supported and located during the moulding operation. The supports used have a central dowel section which fits into the core hole and a shoulder of larger diameter against on which the lamina rests. After moulding when the slabs have been withdrawn from the supports the outlines of the supports are left in the moulded slab and these can be closed and sealed by an elastomeric material if required after the slab has been finished. A portion of slab is shown in FIGURE 3 and the impression of the dowel section in the elastomeric material can be seen.

In some applications it is preferred that the top and bottom lamina of a bearing should be firmly held in their final position in use by means of dowels which are respectively secured to the structure and the foundation and which project into the bearing and respectively locate in the top and bottom lamina. In FIGURE 2 two dowel holes 34 are shown for receiving such dowels and in FIGURE 4 one of these holes is shown in section.

Referring now to FIGURE 5 the bearing shown comprises a top slab 40, an intermediate slab 41 and a bottom slab 42.

The mating surfaces of the slabs are essentially flat but are so treated before stacking as substantially to increase the force required to cause one slab to slide relatively to another beyond such force as would be developed owing to the static friction between them under a specified vertical load. To this end the proximate surfaces of the slabs of the bearing have been given a matt or rough surface during their manufacture which may be formed by etching or by sand-blasting.

The individual slabs have bevelled edges on both sides, as at 43 and 44 on slab 40. The slabs also have core holes (not shown) for locating and positioning the lamina during manufacture and the lamina are provided with equalising holes (not shown) for allowing the elastomeric material to equalise across the lamina during manufacture.

Each of the slabs includes a lamina 45 of reinforcing material embedded in it.

Both the top and bottom surfaces of each slab may have a matt or roughened surface. In this form of the invention only one kind of slab is needed and therefore only one mould is needed in order to provide a range of bearings of varying vertical height for a particular cross-sectional area. Great economy of the production of such bearings is thus secured. Alternatively, two kinds of slab may be used; namely a terminal slab having one matt or roughened surface, i.e. the surfaces 46, 47 of the two terminal slabs, and an intermediate slab having two matt or roughened surfaces 48, 49.

Referring now to FIGURES 6 and 7 the bearing comprises a top terminal slab 50, an intermediate slab 51 and a bottom terminal slab 52. The terminal slab 50 comprises a reinforcing lamina 53 having elastomeric material on one side at 54 which is flat and having a surround 55 of elastomeric material on the other side which forms a central recess 56. The material of the lamina is exposed over the area of the central recess 56 (or it may have a thin coating of elastomeric material due to the difficulty of moulding the elastomeric material to the lamina without some of the elastomeric material flowing over and adhering to this area). The elastomeric material on the flat side at 54 extends around the edge of the lamina and is integral with the surround 55. The edges of the slab are bevelled at 57 and 58. The intermediate slab 51 has on one side a central spigot 60 arranged to locate in the recess 56 of the slab 50. The remainder of this side of the intermediate slab is devoid of elastomeric material (or only has a very thin coating). The other side of the slab has a surround 61 identical to the surround 55 and forming a recess 62. The surround 61 extends around the edge of the lamina 53 of the intermediate slab and lies flush with the top side of this lamina. The edges of the slabs are bevelled at 63 and 64.

The terminal slab 52 has a flat covering 65 of elastomeric material on one side and a central rectangular spigot 66 of elastomeric material on the other side which is arranged to locate in the central recess 62 of the intermediate slab. The covering 65 extends around the edge of the lamina 53 of the bottom terminal slab and lies flush with the top surface of the slab.

The recess 56 has radiused corners, as at 67, and the spigot 60 has slightly protruding radiused corners, as at 68, the corners of the spigot fitting snugly into the corners of the recess. The surfaces of the spigots, as at 69, between the corners are spaced slightly from the adjacent surfaces, as at 70, of the recess when the bearing is unloaded. However, when the bearing is compressively loaded by the vertical load thereon the surfaces of the spigot and the recess between their respective corners tend naturally to bulge and therefore to fill the spaces between them. The two adjacent slabs are therefore positively keyed with respect to each other at all loadings.

The bearing of the invention is made up from separate individual slabs which are each relatively easy to produce. By comparison with the known unitary bearings the moulding and vulcanising operations are significantly easier due to the much lower mass of elastomeric material involved when manufacturing each slab as compared with the manufacture of a large unitary bearing.

What I claim is:

1. A resilient load supporting bearing for civil engineering structures which comprises a stack of superimposed separate slabs of elastomeric material, metal plates each bonded to the elastomeric material of one of said slabs for reinforcing the same and the adjacent surfaces of each pair of slabs being shaped to provide keying means therebetween comprising corresponding projections and recesses whereby the contiguous surfaces of each pair of adjacent slabs constitute the only connection between the slabs and at least one of said adjacent surfaces is elastomeric material.

2. A bearing according to claim 1 in which the stack comprises a first terminal slab, at least one intermediate slab and a second terminal slab.

3. A bearing according to claim 2 in which the first and second terminal slabs each have one flat surface and the keying means are provided on the other surface, said flat surfaces forming the outside surfaces of the stack for engaging the load to be carried and the foundation respectively.

4. A bearing according to claim 3 in which the first terminal slab includes a pattern of recesses on said other surface thereof, each intermediate slab includes a pattern of complementary spigots on a first surface thereof and the second surface of each intermeiate slab comprises a pattern of recesses identical with the pattern of recesses provided on said other surface of the first terminal slab, the second terminal slab including a pattern of spigots on said other surfaces thereof identical with the pattern of spigots on the first surface of each intermediate slab, whereby the slabs are capable of being stacked one upon another with the spigots engaging in the recesses respectively.

5. A bearing according to claim 1 in which the metal plate of each slab is entirely embedded therein.

6. A bearing according to claim 1 in which equalizing holes are provided in the metal plate of each slab with the elastomeric material extending therethrough.

7. A bearing according to claim 1 in which core holes are provided in said metal plates each for receiving dowels for locating the metal plates in position during manufacture.

8. A bearing according to claim 1 in which at least one slab is provided with a central projection extending over a substantial area of the slab, said projection having corner portions extending slightly beyond the edges thereof, an adjacent slab having a recess generally corresponding with the projection, whereby the corner portions of the projections contact the corner portions of the recess but the edges of the projections are spaced slightly from the edges of the recess, whereby in use when the stack of slabs is subjected to a load, the projection is deformed to contact the whole of the inner surface of the recess.

References Cited

UNITED STATES PATENTS 1,917,929  7/1933  Duffy _____ 248—9 X

FOREIGN PATENTS 235,498  9/1961  Australia.
1,239,789  7/1960  France.

ROY D. FRAZIER, *Primary Examiner.*

CHANCELLOR E. HARRIS, *Examiner.*

F. D. DOMOTOR, *Assistant Examiner.*